(12) United States Patent
Braganza et al.

(10) Patent No.: US 11,798,549 B2
(45) Date of Patent: Oct. 24, 2023

(54) GENERATING ACTION ITEMS DURING A CONFERENCING SESSION

(71) Applicant: MITEL NETWORKS CORPORATION, Kanata (CA)

(72) Inventors: Jonathan Braganza, Ottawa (CA); Kevin Lee, Kanata (CA); Logendra Naidoo, Ottawa (CA)

(73) Assignee: Mitel Networks Corporation, Kanata (CA)

(*) Notice: Subject to any disclaimer, the term of this patent is extended or adjusted under 35 U.S.C. 154(b) by 357 days.

(21) Appl. No.: 17/207,233

(22) Filed: Mar. 19, 2021

(65) Prior Publication Data

US 2022/0301557 A1 Sep. 22, 2022

(51) Int. Cl.
*G10L 15/22* (2006.01)
*G10L 15/10* (2006.01)
*G10L 15/18* (2013.01)
*H04L 12/18* (2006.01)

(52) U.S. Cl.
CPC .............. *G10L 15/22* (2013.01); *G10L 15/10* (2013.01); *G10L 15/1815* (2013.01); *H04L 12/1831* (2013.01)

(58) Field of Classification Search
CPC ..... G10L 15/22; G10L 15/10; G10L 15/1815; H04L 12/1831
USPC ......................................................... 704/231
See application file for complete search history.

(56) References Cited

U.S. PATENT DOCUMENTS

| 9,330,659 | B2* | 5/2016 | Ju ............................ G10L 15/22 |
| 10,276,170 | B2* | 4/2019 | Gruber ..................... G06F 3/167 |
| 10,733,222 | B1* | 8/2020 | Miller ...................... G10L 15/26 |
| 10,769,502 | B1* | 9/2020 | Berg ........................ G06F 16/53 |
| 11,030,999 | B1* | 6/2021 | Yu ............................ G10L 15/30 |
| 11,087,750 | B2* | 8/2021 | Ganong, III .......... H04M 1/724 |
| 11,100,922 | B1* | 8/2021 | Mutagi .................... G06F 3/167 |
| 11,361,764 | B1* | 6/2022 | Zhao ....................... G06F 40/30 |
| 11,526,512 | B1* | 12/2022 | Halabi .................... G10L 15/22 |
| 11,574,628 | B1* | 2/2023 | Kumatani .............. H04R 3/005 |

(Continued)

OTHER PUBLICATIONS

Abhishek Sharma, "How Part-of-Speech Tag, Dependency and Constituency Parsing Aid In Understanding Text Data?," Jul. 29, 2020, pp. 1-11, Retrieved from the Internet on Mar. 2, 2021 at URL: <analyticsvidhya.com/blog/2020/07/part-of-speechpos-tagging-dependency-parsing-and-constituency-parsing-in-nlp/>.

(Continued)

*Primary Examiner* — Thuykhanh Le

(57) ABSTRACT

Embodiments include systems and methods for receiving an action item trigger by a user of a conferencing application; and in response to receiving the action item trigger, generating spoken words from audio data of a session of the conferencing application; normalizing the spoken words; generating higher-level representations of the normalized spoken words; determining semantic similarities of the higher-level representations of the normalized spoken words and higher level representations of normalized action words of an action word list; ranking options for top spoken words and action words based at least in part on the semantic similarities; identifying candidates for action words and/or phrases from the top spoken words and action words; and parsing the candidates to generate one or more action items.

19 Claims, 9 Drawing Sheets

(56) References Cited

U.S. PATENT DOCUMENTS

| | | | |
|---|---|---|---|
| 2002/0013710 A1* | 1/2002 | Shimakawa | H04L 12/282 704/E15.044 |
| 2003/0023435 A1* | 1/2003 | Josephson | G10L 15/1822 704/E15.044 |
| 2005/0049874 A1* | 3/2005 | Coffman | G06F 40/58 704/E15.044 |
| 2009/0326936 A1* | 12/2009 | Nagashima | G10L 15/32 704/235 |
| 2014/0219434 A1* | 8/2014 | Youel | H04M 3/563 379/202.01 |
| 2015/0154976 A1* | 6/2015 | Mutagi | G06F 3/167 704/275 |
| 2016/0225369 A1* | 8/2016 | Agrawal | G10L 25/48 |
| 2016/0275950 A1* | 9/2016 | Ogawa | G10L 15/183 |
| 2016/0350280 A1* | 12/2016 | Lavallee | G06F 40/30 |
| 2016/0372112 A1* | 12/2016 | Miller | H04L 51/066 |
| 2018/0121161 A1* | 5/2018 | Ueno | G10L 15/22 |
| 2018/0330721 A1* | 11/2018 | Thomson | G10L 15/1822 |
| 2018/0330723 A1* | 11/2018 | Acero | G10L 25/78 |
| 2019/0012714 A1* | 1/2019 | Bright | G06Q 30/0617 |
| 2019/0087455 A1* | 3/2019 | He | G06F 40/295 |
| 2019/0244607 A1* | 8/2019 | Jo | G10L 15/22 |
| 2019/0304443 A1* | 10/2019 | Bhagwan | G06F 3/167 |
| 2019/0370398 A1* | 12/2019 | He | G06N 20/00 |
| 2020/0005768 A1* | 1/2020 | Chae | H04W 52/0229 |
| 2020/0013395 A1* | 1/2020 | Jeong | G10L 15/22 |
| 2020/0013407 A1* | 1/2020 | Chae | G06F 3/167 |
| 2020/0043478 A1* | 2/2020 | Lee | G10L 15/16 |
| 2020/0118040 A1* | 4/2020 | Dey | G16B 40/00 |
| 2020/0135213 A1* | 4/2020 | Kim | G10L 15/22 |
| 2020/0349919 A1* | 11/2020 | Wanas | G10L 15/1815 |
| 2020/0380963 A1* | 12/2020 | Chappidi | G10L 15/063 |
| 2021/0019309 A1* | 1/2021 | Yadav | G06F 16/2428 |
| 2021/0065704 A1* | 3/2021 | Kim | G10L 15/1822 |
| 2021/0097472 A1* | 4/2021 | Inamdar | G06F 16/24578 |
| 2021/0104234 A1* | 4/2021 | Zhang | G10L 15/197 |
| 2021/0104236 A1* | 4/2021 | Doggett | G10L 15/1822 |
| 2021/0142788 A1* | 5/2021 | Choi | G10L 15/08 |
| 2021/0224264 A1* | 7/2021 | Barve | G06F 17/16 |
| 2022/0020376 A1* | 1/2022 | Garg | G06F 40/295 |
| 2022/0028378 A1* | 1/2022 | Jones | G06F 16/9532 |
| 2022/0044111 A1* | 2/2022 | Singh | G06N 3/045 |
| 2022/0100961 A1* | 3/2022 | Vishnoi | G06F 40/56 |
| 2022/0101839 A1* | 3/2022 | George | G06F 16/353 |
| 2022/0179892 A1* | 6/2022 | Kermode | G06N 3/08 |
| 2022/0199075 A1* | 6/2022 | Padmanabhan | H04L 41/16 |
| 2022/0207392 A1* | 6/2022 | Hou | G10L 15/26 |
| 2022/0215833 A1* | 7/2022 | Delaney | G10L 15/1815 |
| 2022/0222481 A1* | 7/2022 | Mohanty | G06N 3/08 |
| 2022/0230000 A1* | 7/2022 | Jalaluddin | H04L 51/02 |
| 2023/0023630 A1* | 1/2023 | Hamilton | G06N 20/00 |
| 2023/0051413 A1* | 2/2023 | Li | H04M 3/568 |
| 2023/0133583 A1* | 5/2023 | Bui | G06N 20/00 704/9 |

OTHER PUBLICATIONS

Adrien Sieg, "Text Similarities: Estimate the Degree of Similarity between Two Texts," 2018-07-04, pp. 1-98, Retrieved from the Internet on Feb. 23, 2021 at URL: <medium.com/@adriensieg/text-similarities-da019229c894>.

Brendan Hesse, "How to Enable Zoom's New Live Transcriptions," Feb. 26, 2021, pp. 1-3, Retrieved from the Internet on Mar. 1, 2021 at URL: <lifehacker.com/how-to-enable-zooms-new-live-transcriptions-1846364258>.

Christopher D. Manning, et al., "Introduction to Information Retrieval: Chapter 2: The Term Vocabulary and Postings Lists," Apr. 1, 2009, pp. 19-47, Cambridge University Press.

Google Cloud, "Separating Different Speakers in an Audio Recording," Mar. 2021, pp. 1-6, Retrieved from the Internet on Mar. 9, 2021 at URL: <cloud.google.com/speech-to-text/docs/multiple-voices>.

Jason, "NLP-Extract the Action Verb, Nounfroma List of Instructions," Mar. 1, 2017, pp. 1-2, Retrieved from the Internet on Mar. 9, 2021 at URL: <Stackoverflow.com/questions/42539073/nlp-extract-the-action-verb-noun-from-a-list-of-instructions>.

Jiangtao Feng and Xiaoqing Zheng, "Geometric Relationship between Word and Context Representations," 2018, pp. 5102-5109, AAAI.

Jiawei Hu, "An Overview for Text Representations in NLP," Mar. 4, 2020, pp. 1-39, Retrieved from the Internet on Mar. 9, 2021 at URL: <Towardsdatascience.com/an-overview-for-text-representations-in-nlp-311253730af1>.

Rupert Thomas, "Howto Rank Text Content by Semantic Similarity," May 10, 2020, pp. 1-11, Retrieved from the Internet on Mar. 9, 2021 at URL: <Towardsdatascience.com/how-to-rank-text-content-by-semantic-similarity-4d2419a84c32>.

Selva Prabhakaran, "Cosine Similarity - Understanding the Math and How it Works (with Python Codes)," 2021, pp. 1-14, Retrieved from the Internet on Feb. 23, 2021 at URL: <machinelearningplus.com/nlp/cosinesimilarity/#2whatiscosinesimilarityandwhyisitadvantageous>.

Varun, "Building A Deep Learning Neural Network Startup," Jan. 17, 2017, pp. 1-34, Retrieved from the Internet on Mar. 2, 2021 at URL: <medium.com/@startuphackers/building-a-deep-learning-neural-network-startup-7032932e09c>.

* cited by examiner

GENERATING ACTION ITEMS DURING A CONFERENCING SESSION

FIELD

Embodiments relate generally to conferencing applications in computing systems, and more particularly, to automatically generating action items from audible user inputs during sessions of conferencing applications.

BACKGROUND

The use of audio and video conferencing applications is widespread. Millions of users communicate with co-workers, friends, and family using their computing devices (e.g., personal computers, smart phones, and tablet computers) and audio and video conferencing hardware (e.g., cameras, microphones) and software (e.g., commercially available tools such as Teams and Skype from Microsoft® Corporation, Zoom from Zoom Video Communications, Inc., and Webex available from Cisco Systems, Inc.).

During a conferencing session (whether audio or video), there may be times when a user wants to remember and/or keep track of different things that were discussed. Typically, the user would have to take notes during the conferencing session using pen and paper, the computing device that the session is being run on, or another computing device at the user's disposal. This usually distracts the user from the contents of the conferencing session because the user's attention is divided between the session and the note-taking task. In addition, when the user is speaking (for example, if the user is a presenter during a business meeting), it is even more difficult to take notes. Sometimes the discussion in the conferencing session moves so fast that accurate note taking is difficult or impossible. A user may be able to obtain a transcript of the conferencing session after the conferencing session is over and analyze the transcript to identify and record important information that was discussed, but this method is cumbersome, error prone, and time consuming.

BRIEF DESCRIPTION OF THE DRAWINGS

So that the manner in which the above recited features of the present embodiments can be understood in detail, a more particular description of the embodiments, briefly summarized above, may be had by reference to embodiments, some of which are illustrated in the appended drawings. It is to be noted, however, that the appended drawings illustrate only typical embodiments and are therefore not to be considered limiting of its scope. The figures are not to scale. In general, the same reference numbers will be used throughout the drawings and accompanying written description to refer to the same or like parts.

DETAILED DESCRIPTION

Embodiments of the present invention provide a method and system for automatically generating action items from analysis of the audio portion of audio video data from an audio or video conferencing session. In one embodiment, a conferencing application (whether audio or video) includes an action item trigger user interface (UI) mechanism to allow a user to select the action item trigger at any time during the conferencing session. The action item trigger may be a button or selectable icon in the UI of the conferencing application displayed to the user. When the user decides during a conferencing session that something was just discussed in the session for which the user would like to generate an action item to be performed in the future, the user selects the action item trigger and the conferencing application then analyzes the preceding audio data and automatically generates the action item.

Figure 1:
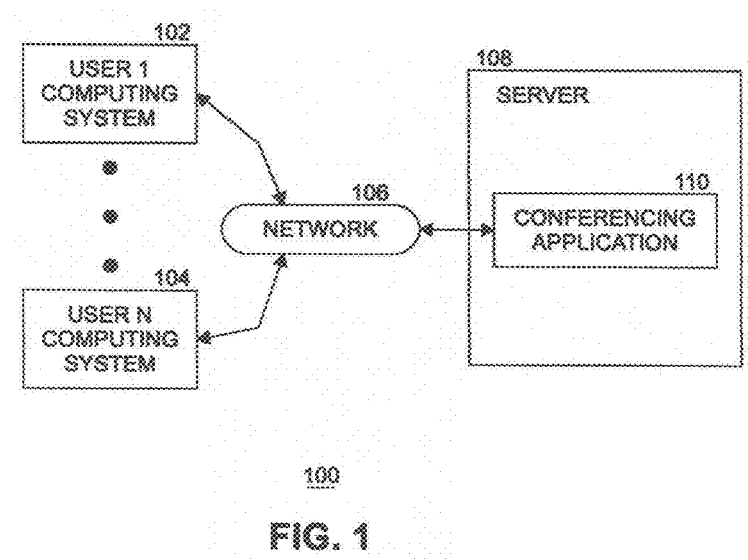
FIG. 1 illustrates an example conferencing system environment.

FIG. 1 illustrates an example conferencing system environment 100. A plurality of users operates user computing systems, such as user 1 computing system 102 to user N computing system 104, where N is a natural number. User computing systems can be any computing device capable of running an audio or video conferencing application providing conferencing functionality (e.g., computing devices with a camera and a microphone, such as personal computers, smartphones, tablet computers, personal digital assistants, kiosks, etc.). Users operating computing systems communicate with each other using conferencing application 110, which is typically running on a server 108 and coupled to the user computing systems over a network 106 (e.g., an intranet or the Internet). Conferencing application 110 is an audio-conferencing application or a video conferencing application. Server 108 is situated in a data center, such as those operated by cloud service providers (CSPs) or by the information technology (IT) departments of businesses. At least a portion of conferencing application 110 may be running on the user computing systems (for example, to provide multimedia UI capability for the users to see and talk to the other users).

Figure 2:
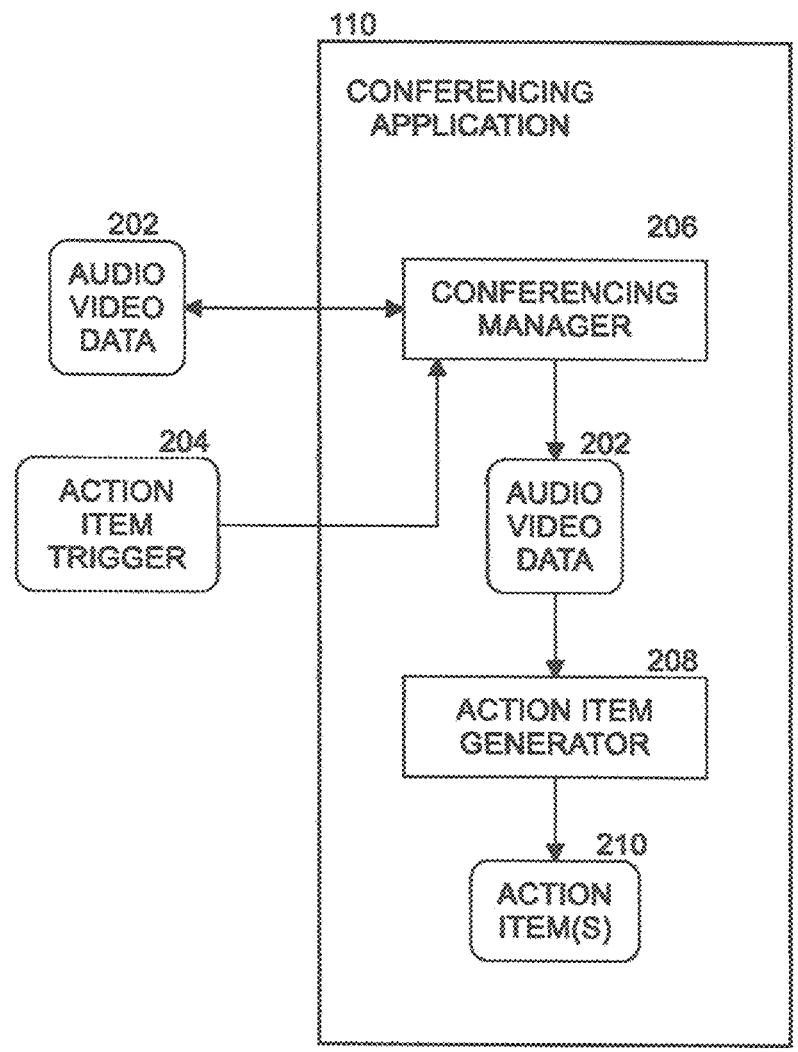
FIG. 2 illustrates a conferencing application according to some embodiments.

FIG. 2 illustrates conferencing application 110 according to some embodiments. Conferencing application 110 includes conferencing manager 206 to send and receive audio and video data 202 to and from user computing systems according to well-known methods. As used herein, audio and video data 202 may include only audio data or audio and video data. In an embodiment, conferencing application 110 also provides a mechanism for a user to initiate, in real-time during an active (e.g., live) conferencing session, an action item trigger 204. The mechanism can be any UI capability whereby the user indicates initiation of the action item trigger. For example, the mechanism can be a button, icon, or menu selection on the displayed interface of the conferencing application running on the user computing system. Alternatively, the conferencing application includes a voice recognition capability using well-known techniques to recognize a selected key word or phrase (e.g., "take action item", "remember this", "remind me", "important" and the like) spoken by the user during the conferencing session. Regardless of the action item trigger mechanism used, when conferencing manager 206 is notified of action item trigger 204, the conferencing manager sends audio video data 202 to action item generator 208 for processing. Action item generator 208 extracts the audio portion of audio video data 202, analyzes the audio data to identify items of potential interest discussed by the users in the conferencing session based at least in part on action item triggers, and automatically generates one or more action item(s) 210.

As used herein, action items can be any type of action desired to be performed by the user during or after the conferencing session. For example, an action item is an action where one or more of the users in the conferencing session (or even someone not participating in the conferencing session but who is mentioned) is assigned one or more tasks to be performed (e.g., "George, make sure that the proposal gets completed"). In another example, an action item is a question that was asked but not answered during the conferencing session (e.g., "How many processor units did we ship last week?"). In another example, an action item is the scheduling of a meeting at a later date (e.g., "We should probably schedule a meeting next Tuesday to go over the merger details"). In a further example, an action item is a note to be prepared to save something that was said during the conferencing session (e.g., "We have increased revenue by 25% year over year"). In a still further example, an action item is a task to prepare a text summarization of what was said during the conferencing session preceding occurrence of the action item trigger. Other types of action items may also be used.

When an action item is generated, conferencing application 110 may interface with other applications on server 108 or one of the user computing systems 102 . . . 104 to communicate the action item and to cause further processing to be performed. For example, when the action item is an action or a question, conferencing application 110 may interface with an email application to send an email to a user's email account assigned the action item notifying that user of the assignment of the action/task or question. For example, when the action item is a meeting, conferencing application 110 may interface with a calendar application to schedule the requested meeting. For example, when the action item is a note, conferencing application 110 may interface with a note application to store and/or send a note with the saved information. Other communications as a result of generating an action item could include making a telephone call or video call, sending an instant message or text, transferring a file, and so on.

In one embodiment, action item generator 208 analyzes the previous Y sentences in the audio data from the time of the action item trigger to identify one or more action items, where Y is a natural number that can be predetermined, defined and/or updated (e.g., the last two sentences, the last three sentences, etc.). In another embodiment, action item generator 208 analyzes the previous Z seconds of the audio data from the time of the input by the user of the action item trigger to identify one or more action items, where Z is a natural number that can be predetermined, defined and/or updated (e.g., the last ten seconds, the last thirty seconds, the last sixty seconds, etc.). If there are no action items generated from the previous section of audio data (either defined by sentences or time), action item generator 208 may go back to the next immediately preceding section of audio data (defined either by number of sentences (utterances) or time) and repeat the analysis until one or more action items is generated. The number of preceding sections of audio data to analyze may be set and/or changed by the user.

In another embodiment, action item generator 208 identifies content in the audio data and excludes from processing any content attributable to the user. This allows conferencing application 110 to be set by a user to only generate action items for other users. Techniques for identifying speakers in audio data (sometimes called speaker diarization) are well known. In one embodiment, a cloud speech to text application programming interface (API) available from Google at cloud.google.com*speech-to-text*docs*multiple-voices (with "/" replaced with "*" to prevent a live link) may be used to determine which user has spoken selected content in the audio data. In other embodiments, other speaker identification methods may also be used.

Figure 3:
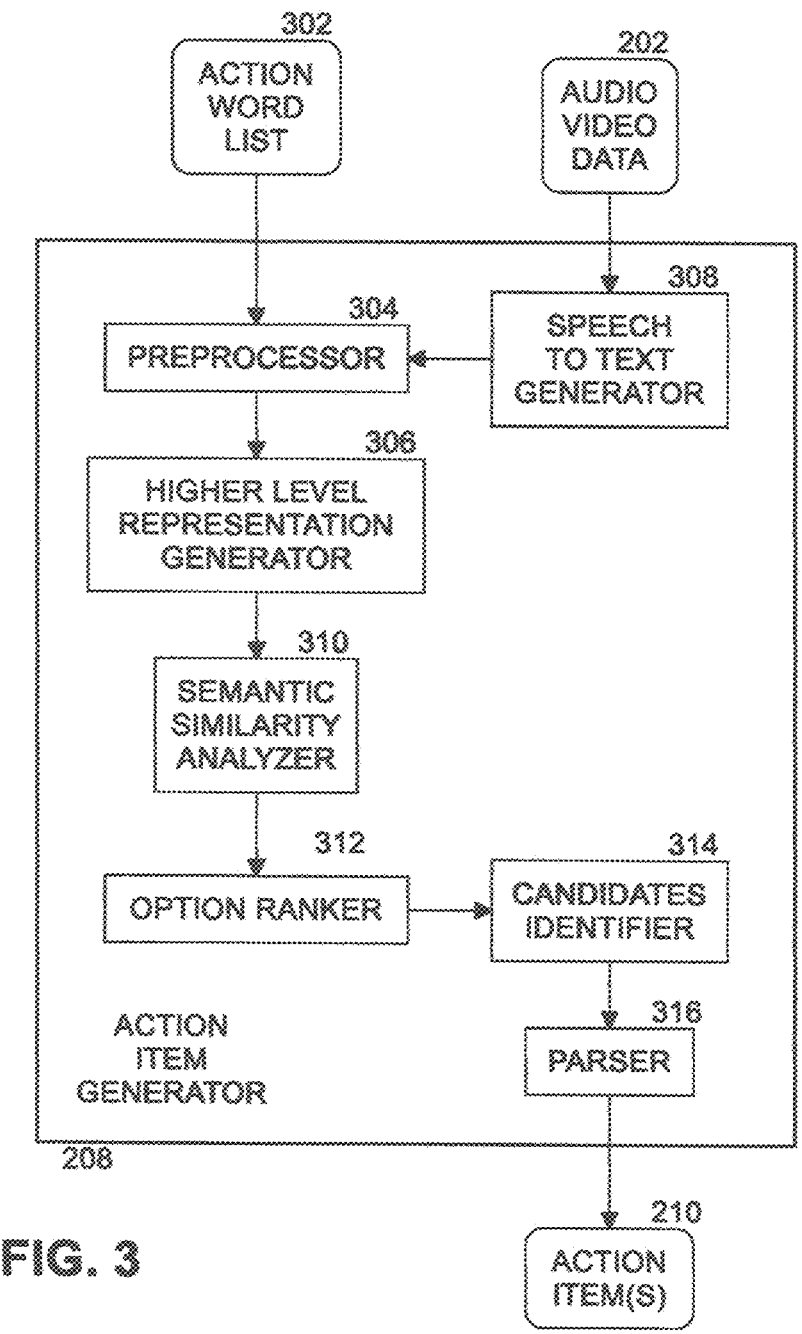
FIG. 3 is a diagram of an action item generator according to some embodiments.

FIG. 3 is a diagram of an action item generator 208 according to some embodiments. In an embodiment, action word list 302 is a library of common action words obtained from an English language dictionary. In other embodiments, other languages may be used. Action word list 302 also includes words and phrases that are similar to and/or synonyms of the common action words. These words and phrases include slang. In an embodiment, action word list 302 is expanded to include one or more private lexicons. For example, a private lexicon may include jargon specific to the anticipated content of the user's conferencing sessions. For example, if the conferencing sessions are part of a business meeting for a business in a particular industry, the jargon included in the action word list includes action words for that industry. In an embodiment, action word list 302 includes a private lexicon having words from a reference dictionary for a particular academic field (e.g., chemistry, physics, biology, etc.), particular topics of conversation (e.g., sports, travel, entertainment, finance, etc.), local or regional dialect, age group, and so on.

Figure 4:
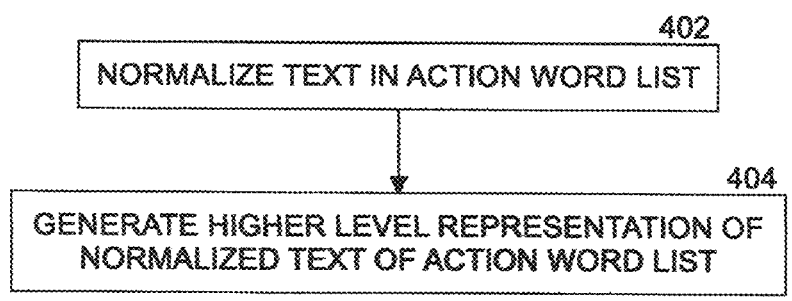
FIG. 4 is a flow diagram of pre-processing an action word list according to some embodiments.

Action word list 302 is input to preprocessor 304 of action item generator 208. FIG. 4 is a flow diagram of preprocessing action word list 302 according to some embodiments. At block 402, preprocessor 304 normalizes the text in action word list 302. First, the text is filtered to remove common "stop" words such as "a", "an", "the", "I", "we", etc. In one embodiment, the words remaining after stop word filtering are converted to their root form (this is also called lemmatization). In an embodiment, lemmatization is performed as described in Section 2.2.4, pages 32-36 of "Introduction to Information Retrieval" by Christopher D. Manning, Prabhakar Raghavan, and Hinrich Schütze, Cambridge University Press, 2008. Next, morphologically related words are indexed together. Morphemes are generated through lemmatization (or stemming of the words) to determine root words. For example, the word "election" may be processed to determine "elect" and the word "elected" may also be processed to determine "elect".

At block 404, higher level representation generator 306 generates a higher-level representation (HLR) of the normalized text of the action word list. First, higher level representation generator 306 creates a numerical representation of the action words. The numerical representations are abstractions of the action words. In an embodiment using "one-hot encoding", every word (including symbols) that is part of the text is written in the form of a vector constituting only 1s and 0s. In an embodiment, the numerical representations are generated by passing the action words (after preprocessing) into a shallow or deep machine learning model. Next, higher-level representation generator 306 compares the numerical representations of the action words to numerical representations of dictionary words and/or private lexicons. This gives an understanding as to how similar two or more words are to each other. The results of preprocessing and higher-level representation processing of the action word list are stored for future use.

In an embodiment, the processing of the action word list is performed prior to starting a conferencing session. In another embodiment, this processing is performed at initialization time of the conferencing application. In a further embodiment, this processing is performed periodically and/or whenever the action word list is changed. For example, the action word list may be changed by adding or replacing one or more private lexicons to the action word list.

When action item generator 208 receives an action item trigger 204, speech to text generator 308 analyzes a preceding portion of audio video data 202 received from conferencing manager 206 to generate text representing the spoken words in the portion according to well-known methods. Preprocessor 304 and higher-level representation generator 306 process the spoken words in the same manner as described above for words in the action word list.

In one embodiment, generating a list of action words from a corpus of text (e.g., text obtained from speech to text generator 308) is performed by identifying verbs and root words in a natural language processing (NLP) parser.

Semantic similarity analyzer 310 compares the higher-level representations (HLRs) of the spoken words to action words. In an embodiment, scoring is used to represent how similar the spoken words are to action words. Semantic scoring scores words that are based on semantic similarity irrespective of the fact that they are not exact matches. In an embodiment, this is performed using a NLP technique known as embedding. Spoken words and action words with their context are converted into vectors and then compared. In an embodiment, an encoder in semantic similarity analyzer 310 converts words into integers, collects strings of the integers into vectors, and places the integers into a three-dimensional plane to apply geometrical principles. Natural language processing (NLP) employs geometrical principles to allow computer systems to address the problem of extracting information from language systems by constructing mathematical representations (useful for NLP). The translation of linguistic structures into geometrical entities are more manageable by computer programs.

In an embodiment, the similarity is determined using cosine similarity. In one embodiment, cosine similarity is implemented as described in "Cosine Similarity: Understanding the math and how it works (with Python codes)" by Selva Prabhakaran, available at machinelearningplus*com/mlp/cosine-similarity/#2whatiscosinesimilarityandwhyisitadvantageous (with "." replaced by "*" to prevent a live link). In another embodiment, similarity is determined using a jaccard index as described in "Text Similarities: Estimate the degree of similarity between two texts" by Adrien Sieg, published Jul. 4, 2018, available at medium*com/@adriensieg/text-similarities-da019229c894 (with "." replaced by "*" to prevent a live link).

Option ranker 312 determines the semantic distinction between top spoken words and action words (e.g., based on a semantic score). For example, two words being analyzed may be very similar to each other, therefore they represent a likely candidate for action items. Here, only the scoring is analyzed. In an embodiment, options are ranked in an increasing or decreasing order.

Semantic distinctiveness when used in a language analysis system is used to accurately measure semantic relatedness between passages of text or individual words. This approach determines that the identification and alignment of semantically similar or related words across two sentences (and the aggregation of these similarities to generate an overall similarity such as a score) is required to accurately measure semantic relatedness between concepts or entities. Without measuring the semantic distinctiveness, systems would be ill equipped to find words that are similar in meaning and the consequence would be reflected in unhelpful analysis (for example, 'money', 'cash', 'coin', 'credit card' have semantic similarity; 'money', 'congestion', 'currants', 'dowel' have little semantic similarity).

Candidates identifier 314 identifies key phrases and sentences as candidate action words. For example, all ranked options with a similarity score over a selected value (for example, 0.8) may be kept as candidate words. The sentences where candidate words are found are candidate phrases. For example, "The meeting is scheduled for 7 pm" is a candidate phrase and action words for this candidate phrase are "meeting" and "scheduled."

Once the most relevant terms are extracted from "Remember This" audio segments, model sentence-patterns and helpful words (in certain contexts such as with action items) can be proposed to create human-like responses. Action item generator 208 can generate meaningful responses if the generator is given the words that represent meaningful words, the generator can then add in additional words based on linguistic precedence.

Figure 5:
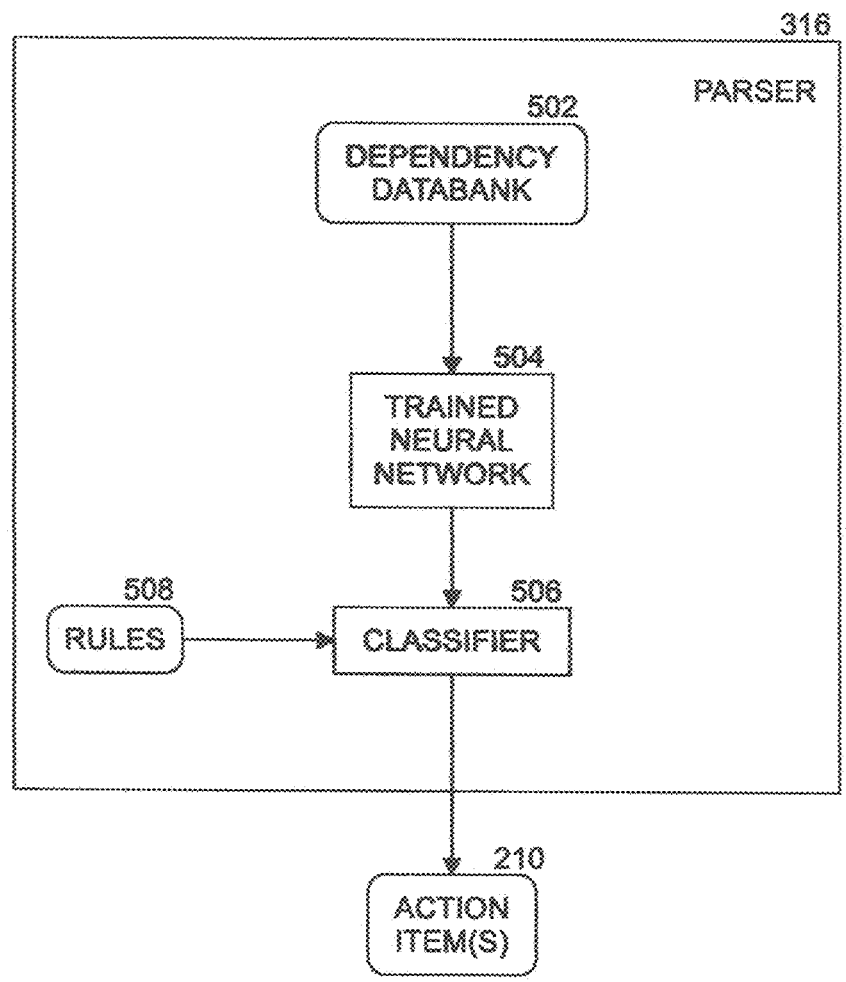
FIG. 5 is a diagram of a parser based on candidate action words according to some embodiments.

Parser 316 generates action item(s) 210 based at least in part on identified candidate action words. Neural networks are neurological-inspired programming paradigms that use computational methods that learn from an observational dataset(s). A neural network of an embodiment relies on exemplary data samples for the system to train on (e.g., candidate action words and phrases). Application of too little training data results in poor response approximations. FIG. 5 is a diagram of parser 316 based on candidate action words according to some embodiments. Dependency databank 502 is a training dataset for neural network processing. Action item generator 208 is trained on extracted words (e.g., the candidate action words) to model a human-like response. In trained neural network 504, candidate action words and phrases are scanned (sentence by sentence or word by word). Trained neural network 504 divides each candidate sentence into words. (for example, "the meeting is scheduled at 7 pm"). Scanned phrases are molded into responsive data structures (e.g., silos, stacks, and/or buffers). These stacks and/or buffers are controlled by rules 508, which are then in turn inputted into classifier 506 (essentially an extension of the neural network). Rules 508 comprise "handcrafted parameters" (e.g., set by a system administrator or domain expert) to improve the standard rule set which may not be flexible enough to handle different linguistic structures. In an embodiment, rules 508 include a unique set of linguistic rules that provide additional meaning to the most relevant linguistic structures versus ones that are less helpful (for example, "lunchtime" vs. "12 pm"). Rules may also be specific to a private lexicon.

Classifier 506 classifies words and/or tokens of each candidate action phrase into known dependency classes (in accordance with training data in dependency database 502). Classifier 506 generates one or more action items 210 based at least in part on the dependency classes. In an embodiment, typical NLP classification techniques are applied to nouns, verbs, adjectives, etc. Action items 210 may include sentences created from sentence templates such that relevant keywords identified in candidate action words and/or phrases are added to the template to create the sentence representing the action item.

Figure 6:
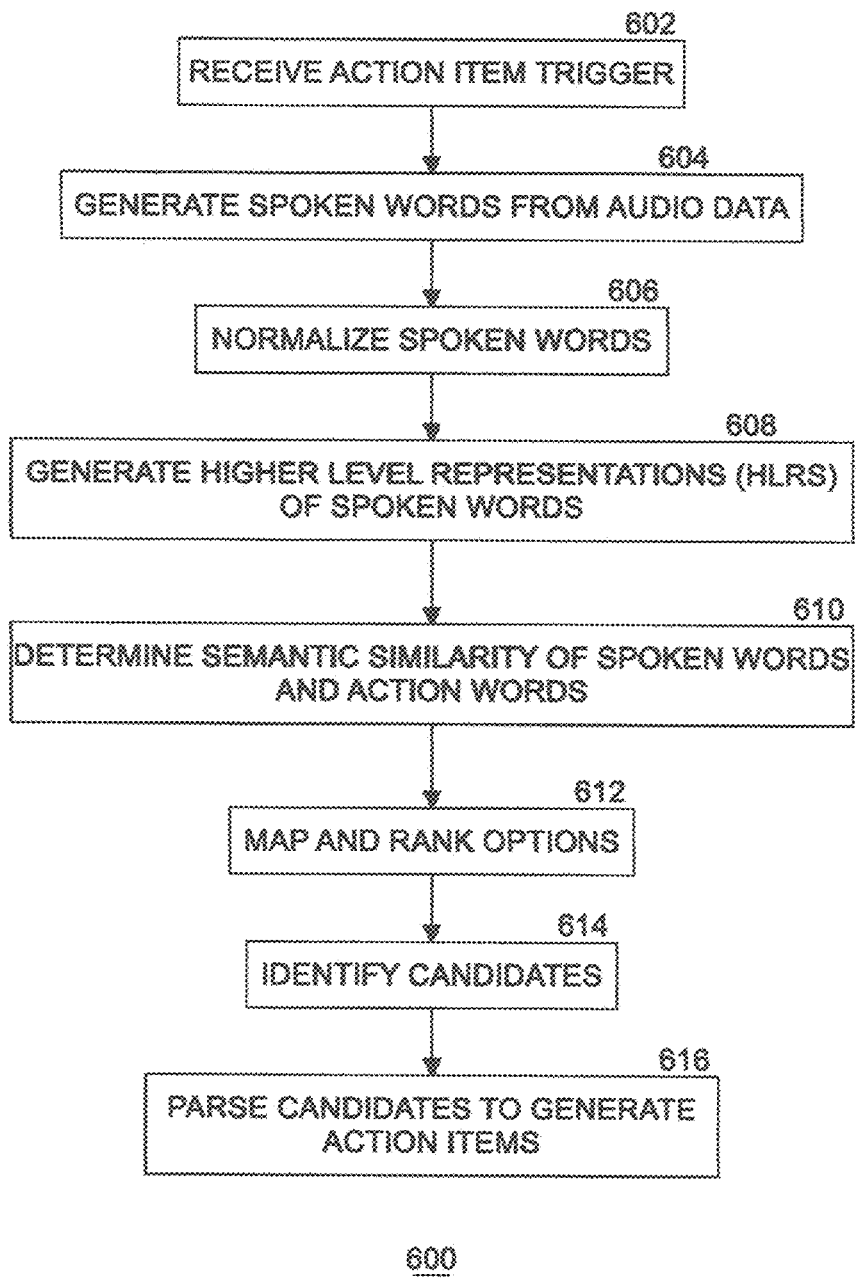
FIG. 6 is a flow diagram of action item generator processing according to some embodiments.

FIG. 6 is a flow diagram 600 of action item generator 208 processing according to some embodiments. At block 602, conferencing application 110 receives an action item trigger 204. In response to receiving the action item trigger, at block 604, speech to text generator 308 of action item generator 208 generates spoken words from the audio portion of audio video data 202. At block 606, preprocessor 304 of action item generator 208 normalizes the spoken words. At block 608, higher level representation generator 306 of action item generator 208 generates higher level representations (HLRs) of the normalized spoken words. At block 608, semantic similarity analyzer 310 of action item generator 208 determines the semantic similarity of the HLRs of the normalized spoken words from audio video data 202 and of the action words from action word list 302. At block 612, option ranker 612 of action item generator 208 maps and ranks options for top spoken words and action words based at least in part on the semantic similarities. At block 614, candidates identifier 314 of action item generator 208 identifies candidates for action words and/or phrases from the top spoken words and action words. Finally, at block 616, parser 316 of action item generator 208 parses the candidates to generate one or more action items 210.

Figure 7:
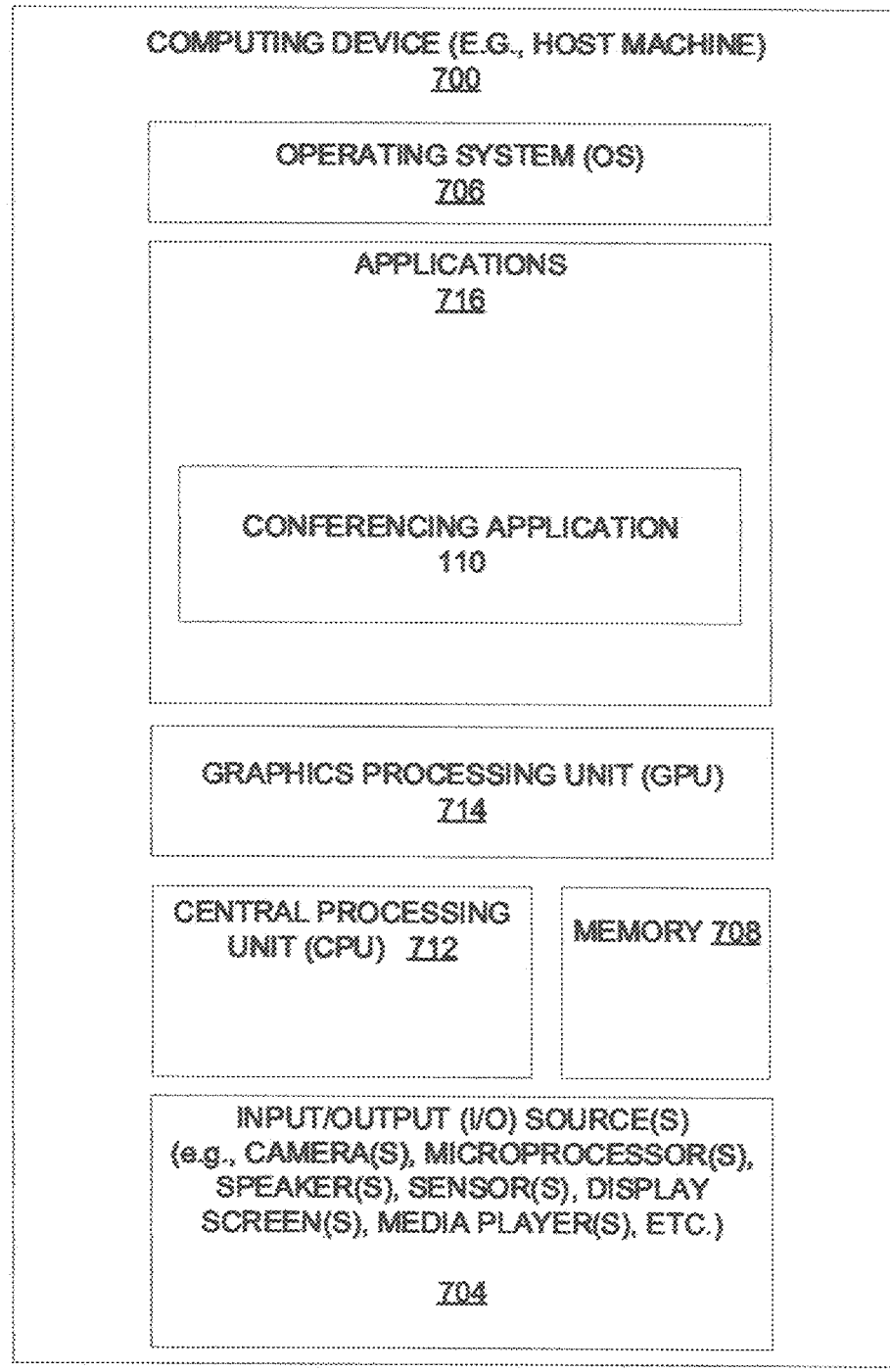
FIG. 7 illustrates a computing device employing a conferencing application, according to an embodiment.

FIG. 7 illustrates one embodiment of a computing device 700 (e.g., a host machine) executing one or more applications 716 such as conferencing application 110. Computing device 700 (e.g., smart wearable devices, virtual reality (VR) devices, head-mounted display (HMDs), mobile computers, Internet of Things (IoT) devices, laptop computers, desktop computers, server computers, smartphones, etc.) is shown as hosting conferencing application 110.

In some embodiments, some or all of conferencing application 110 may be hosted by or part of firmware of graphics processing unit (GPU) 714. In yet other embodiments, some or all of conferencing application 110 may be hosted by or be a part of firmware of central processing unit ("CPU" or "application processor") 712.

In yet another embodiment, conferencing application 110 may be hosted as software or firmware logic by operating system (OS) 706. In yet a further embodiment, conferencing application 110 may be partially and simultaneously hosted by multiple components of computing device 700, such as one or more of GPU 714, GPU firmware (not shown in FIG. 7), CPU 712, CPU firmware (not shown in FIG. 7), operating system 706, and/or the like. It is contemplated that conferencing application 110 or one or more of the constituent components may be implemented as hardware, software, and/or firmware.

Throughout the document, term "user" may be interchangeably referred to as "viewer", "observer", "person", "individual", "end-user", and/or the like. It is to be noted that throughout this document, terms like "graphics domain" may be referenced interchangeably with "graphics processing unit", "graphics processor", or simply "GPU" and similarly, "CPU domain" or "host domain" may be referenced interchangeably with "computer processing unit", "application processor", or simply "CPU".

Computing device 700 may include any number and type of communication devices, such as large computing systems, such as server computers, desktop computers, etc., and may further include set-top boxes (e.g., Internet-based cable television set-top boxes, etc.), global positioning system (GPS)-based devices, etc. Computing device 700 may include mobile computing devices serving as communication devices, such as cellular phones including smartphones, personal digital assistants (PDAs), tablet computers, laptop computers, e-readers, smart televisions, television platforms, wearable devices (e.g., glasses, watches, bracelets, smartcards, jewelry, clothing items, etc.), media players, etc.

For example, in one embodiment, computing device 700 may include a mobile computing device employing a computer platform hosting an integrated circuit ("IC"), such as system on a chip ("SoC" or "SOC"), integrating various hardware and/or software components of computing device 700 on a single chip.

As illustrated, in one embodiment, computing device 700 may include any number and type of hardware and/or software components, such as (without limitation) GPU 714, a graphics driver (also referred to as "GPU driver", "graphics driver logic", "driver logic", user-mode driver (UMD), UMD, user-mode driver framework (UMDF), UMDF, or simply "driver") (not shown in FIG. 7), CPU 712, memory 708, network devices, drivers, or the like, as well as input/output (I/O) sources 704, such as touchscreens, touch panels, touch pads, virtual or regular keyboards, virtual or regular mice, ports, connectors, etc.

Computing device 700 may include operating system (OS) 706 serving as an interface between hardware and/or physical resources of the computer device 700 and a user. It is contemplated that CPU 712 may include one or more processors, such as processor(s) 702 of FIG. 7, while GPU 714 may include one or more graphics processors (or multiprocessors).

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

It is contemplated that some processes of the graphics pipeline as described herein are implemented in software, while the rest are implemented in hardware. A graphics pipeline (such as may be at least a part of conferencing application 110) may be implemented in a graphics coprocessor design, where CPU 412 is designed to work with GPU 714 which may be included in or co-located with CPU 712. In one embodiment, GPU 714 may employ any number and type of conventional software and hardware logic to perform the conventional functions relating to graphics rendering as well as novel software and hardware logic to execute any number and type of instructions.

Memory 708 may include a random-access memory (RAM) comprising application database having object information. A memory controller hub (not shown in FIG. 7) may access data in the RAM and forward it to GPU 714 for graphics pipeline processing. RAM may include double data rate RAM (DDR RAM), extended data output RAM (EDO RAM), etc. CPU 712 interacts with a hardware graphics pipeline to share graphics pipelining functionality.

Processed data is stored in a buffer in the hardware graphics pipeline, and state information is stored in memory 708. The resulting image is then transferred to I/O sources 704, such as a display component for displaying of the image. It is contemplated that the display device may be of various types, such as Cathode Ray Tube (CRT), Thin Film Transistor (TFT), Liquid Crystal Display (LCD), Organic Light Emitting Diode (OLED) array, etc., to display information to a user.

Memory 708 may comprise a pre-allocated region of a buffer (e.g., frame buffer); however, it should be understood by one of ordinary skill in the art that the embodiments are not so limited, and that any memory accessible to the lower graphics pipeline may be used. Computing device 700 may further include an input/output (I/O) control hub (ICH) (not shown in FIG. 7), as one or more I/O sources 704, etc.

CPU 712 may include one or more processors to execute instructions to perform whatever software routines the computing system implements. The instructions frequently involve some sort of operation performed upon data. Both data and instructions may be stored in system memory 708 and any associated cache. Cache is typically designed to have shorter latency times than system memory 708; for example, cache might be integrated onto the same silicon chip(s) as the processor(s) and/or constructed with faster static RAM (SRAM) cells whilst the system memory 708 might be constructed with slower dynamic RAM (DRAM) cells. By tending to store more frequently used instructions and data in the cache as opposed to the system memory 708, the overall performance efficiency of computing device 700 improves. It is contemplated that in some embodiments, GPU 714 may exist as part of CPU 712 (such as part of a physical CPU package) in which case, memory 708 may be shared by CPU 712 and GPU 714 or kept separated.

System memory 708 may be made available to other components within the computing device 700. For example, any data (e.g., input graphics data) received from various interfaces to the computing device 700 (e.g., keyboard and mouse, printer port, Local Area Network (LAN) port, modem port, etc.) or retrieved from an internal storage element of the computer device 700 (e.g., hard disk drive) are often temporarily queued into system memory 708 prior to being operated upon by the one or more processor(s) in the implementation of a software program. Similarly, data that a software program determines should be sent from the computing device 700 to an outside entity through one of the computing system interfaces, or stored into an internal storage element, is often temporarily queued in system memory 708 prior to its being transmitted or stored.

Further, for example, an ICH may be used for ensuring that such data is properly passed between the system memory 708 and its appropriate corresponding computing system interface (and internal storage device if the computing system is so designed) and may have bi-directional point-to-point links between itself and the observed I/O sources/devices 704. Similarly, an MCH may be used for managing the various contending requests for system memory 708 accesses amongst CPU 712 and GPU 714, interfaces and internal storage elements that may proximately arise in time with respect to one another.

I/O sources 704 may include one or more I/O devices that are implemented for transferring data to and/or from computing device 700 (e.g., a networking adapter); or, for a large-scale non-volatile storage within computing device 700 (e.g., hard disk drive). User input device, including alphanumeric and other keys, may be used to communicate information and command selections to GPU 714. Another type of user input device is cursor control, such as a mouse, a trackball, a touchscreen, a touchpad, or cursor direction keys to communicate direction information and command selections to GPU 714 and to control cursor movement on the display device. Camera and microphone arrays of computer device 700 may be employed to observe gestures, record audio and video and to receive and transmit visual and audio commands.

Computing device 700 may further include network interface(s) to provide access to a network, such as a LAN, a wide area network (WAN), a metropolitan area network (MAN), a personal area network (PAN), Bluetooth, a cloud network, a mobile network (e.g., 3rd Generation (3G), 4th Generation (4G), etc.), an intranet, the Internet, etc. Network interface(s) may include, for example, a wireless network interface having antenna, which may represent one or more antenna(e). Network interface(s) may also include, for example, a wired network interface to communicate with remote devices via network cable, which may be, for example, an Ethernet cable, a coaxial cable, a fiber optic cable, a serial cable, or a parallel cable.

Network interface(s) may provide access to a LAN, for example, by conforming to IEEE 802.11b and/or IEEE 802.11g standards, and/or the wireless network interface may provide access to a personal area network, for example, by conforming to Bluetooth standards. Other wireless network interfaces and/or protocols, including previous and subsequent versions of the standards, may also be supported. In addition to, or instead of, communication via the wireless LAN standards, network interface(s) may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

Network interface(s) may include one or more communication interfaces, such as a modem, a network interface card, or other well-known interface devices, such as those used for coupling to the Ethernet, token ring, or other types of physical wired or wireless attachments for purposes of providing a communication link to support a LAN or a WAN, for example. In this manner, the computer system may also be coupled to a number of peripheral devices, clients, control surfaces, consoles, or servers via a conventional network infrastructure, including an Intranet or the Internet, for example.

It is to be appreciated that a lesser or more equipped system than the example described above may be preferred for certain implementations. Therefore, the configuration of computing device 700 may vary from implementation to implementation depending upon numerous factors, such as price constraints, performance requirements, technological improvements, or other circumstances. Examples of the electronic device or computer system 700 may include (without limitation) a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any or a combination of: one or more microchips or integrated circuits interconnected using a parent board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more tangible non-transitory machine-readable media having stored thereon machine-executable instructions that, when executed by one or more machines such as a computer, network of computers, or other electronic devices, may result in the one or more machines carrying out operations in accordance with embodiments described herein. A tangible non-transitory machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Machine Learning Overview

A machine learning algorithm is an algorithm that can learn based on a set of data. Embodiments of machine learning algorithms can be designed to model high-level abstractions within a data set. For example, classification algorithms can be used to determine which of several categories to which a given input belongs; regression algorithms can output a numerical value given an input; and pattern recognition algorithms can be used to generate translated text or perform text to speech and/or speech recognition.

An exemplary type of machine learning algorithm is a neural network (such as trained neural network 504). There are many types of neural networks; a simple type of neural network is a feedforward network. A feedforward network may be implemented as an acyclic graph in which the nodes are arranged in layers. Typically, a feedforward network topology includes an input layer and an output layer that are separated by at least one hidden layer. The hidden layer transforms input received by the input layer into a representation that is useful for generating output in the output layer. The network nodes are fully connected via edges to the nodes in adjacent layers, but there are no edges between nodes within each layer. Data received at the nodes of an input layer of a feedforward network are propagated (i.e., "fed forward") to the nodes of the output layer via an activation function that calculates the states of the nodes of each successive layer in the network based on coefficients ("weights") respectively associated with each of the edges connecting the layers. Depending on the specific model being represented by the algorithm being executed, the output from the neural network algorithm can take various forms.

Before a machine learning algorithm can be used to model a particular problem, the algorithm is trained using a training data set (e.g., dependency databank 502). Training a neural network involves selecting a network topology, using a set of training data representing a problem being modeled by the network, and adjusting the weights until the network model performs with a minimal error for all instances of the training data set. For example, during a supervised learning training process for a neural network, the output produced by the network in response to the input representing an instance in a training data set is compared to the "correct" labeled output for that instance, an error signal representing the difference between the output and the labeled output is calculated, and the weights associated with the connections are adjusted to minimize that error as the error signal is backward propagated through the layers of the network. The network is considered "trained" when the errors for each of the outputs generated from the instances of the training data set are minimized.

The accuracy of a machine learning algorithm can be affected significantly by the quality of the data set used to train the algorithm. The training process can be computationally intensive and may require a significant amount of time on a conventional general-purpose processor. Accordingly, parallel processing hardware is used to train many types of machine learning algorithms. This is particularly useful for optimizing the training of neural networks, as the computations performed in adjusting the coefficients in neural networks lend themselves naturally to parallel implementations. Specifically, many machine learning algorithms and software applications have been adapted to make use of the parallel processing hardware within general-purpose graphics processing devices.

Figure 8:
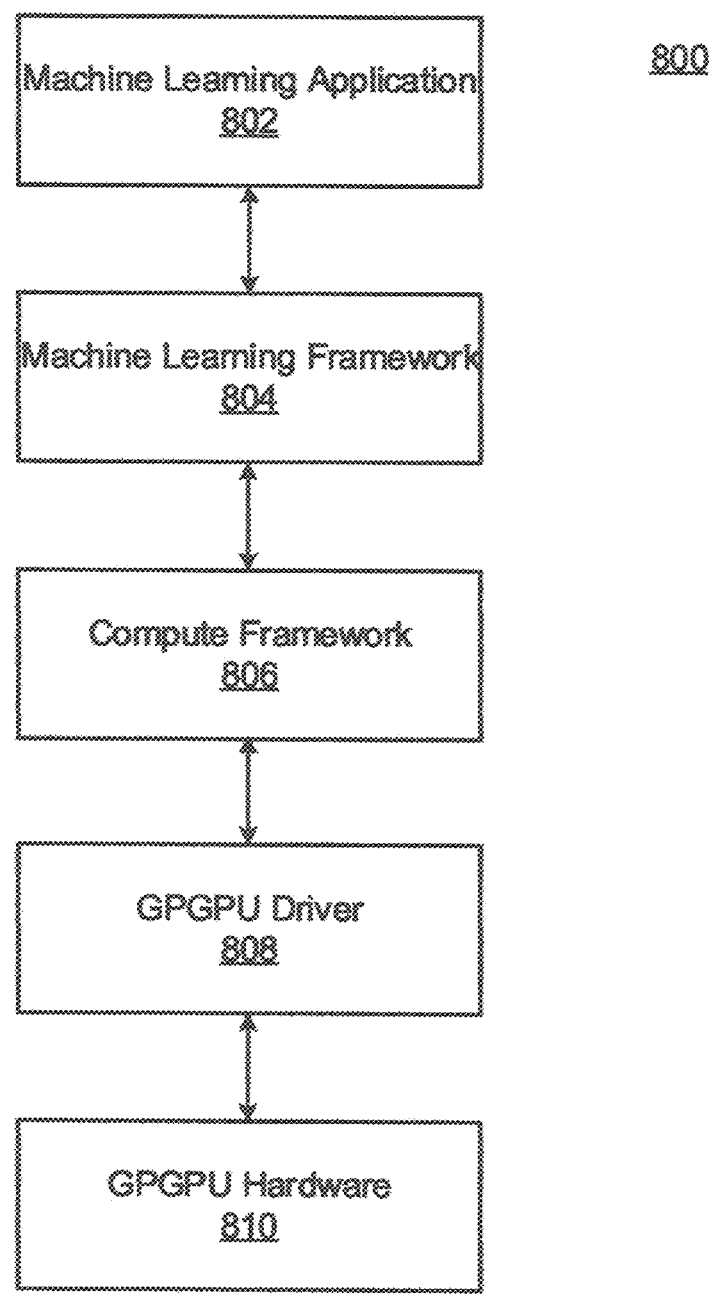
FIG. 8 illustrates a machine learning software stack, according to an embodiment.

FIG. 8 is a generalized diagram of a machine learning software stack 800. A machine learning application 802 (e.g., conferencing application 110 and/or action item generator 208) can be configured to train a neural network 504 using a training dataset (e.g., dependency databank 502) or to use a trained deep neural network to implement machine intelligence. The machine learning application 802 can include training and inference functionality for a neural network and/or specialized software that can be used to train a neural network before deployment. The machine learning application 802 can implement any type of machine intelligence including but not limited to classification, image recognition, mapping and localization, autonomous navigation, speech synthesis, medical imaging, or language translation.

Hardware acceleration for the machine learning application 802 can be enabled via a machine learning framework 804. The machine learning framework 804 can provide a library of machine learning primitives. Machine learning primitives are basic operations that are commonly performed by machine learning algorithms. Without the machine learning framework 804, developers of machine learning algorithms would be required to create and optimize the main computational logic associated with the machine learning algorithm, then re-optimize the computational logic as new parallel processors are developed. Instead, the machine learning application can be configured to perform the necessary computations using the primitives provided by the machine learning framework 804. Exemplary primitives include tensor convolutions, activation functions, and pooling, which are computational operations that are performed while training a convolutional neural network (CNN). The machine learning framework 804 can also provide primitives to implement basic linear algebra subprograms performed by many machine-learning algorithms, such as matrix and vector operations.

The machine learning framework 804 can process input data received from the machine learning application 802 and generate the appropriate input to a compute framework 806. The compute framework 806 can abstract the underlying instructions provided to a GPGPU driver 805 to enable the machine learning framework 804 to take advantage of hardware acceleration via the GPGPU hardware 810 without requiring the machine learning framework 804 to have intimate knowledge of the architecture of the GPGPU hardware 810. Additionally, the compute framework 806 can enable hardware acceleration for the machine learning framework 804 across a variety of types and generations of the GPGPU hardware 810.

Machine Learning Neural Network Implementations

The computing architecture provided by embodiments described herein can be configured to perform the types of parallel processing that is particularly suited for training and deploying neural networks for machine learning. A neural network can be generalized as a network of functions having a graph relationship. As is well-known in the art, there are a variety of types of neural network implementations used in machine learning. One exemplary type of neural network is the feedforward network.

Recurrent neural networks (RNNs) are a family of feedforward neural networks that include feedback connections between layers. RNNs enable modeling of sequential data by sharing parameter data across different parts of the neural network. The architecture for a RNN includes cycles. The cycles represent the influence of a present value of a variable on its own value at a future time, as at least a portion of the output data from the RNN is used as feedback for processing subsequent input in a sequence. This feature makes RNNs particularly useful for language processing due to the variable nature in which language data can be composed.

The figures described herein present exemplary feedforward and RNN networks, as well as describe a general process for respectively training and deploying each of those types of networks. It will be understood that these descriptions are exemplary and non-limiting as to any specific embodiment described herein and the concepts illustrated can be applied generally to deep neural networks and machine learning techniques in general.

The exemplary neural networks described above can be used to perform deep learning. Deep learning is machine learning using deep neural networks. The deep neural networks used in deep learning are artificial neural networks composed of multiple hidden layers, as opposed to shallow neural networks that include only a single hidden layer. Deeper neural networks are generally more computationally intensive to train. However, the additional hidden layers of the network enable multistep pattern recognition that results in reduced output error relative to shallow machine learning techniques.

Deep neural networks used in deep learning typically include a front-end network to perform feature recognition coupled to a back-end network which represents a mathematical model that can perform operations (e.g., classification, speech recognition, etc.) based on the feature representation provided to the model. Deep learning enables machine learning to be performed without requiring hand crafted feature engineering to be performed for the model. Instead, deep neural networks can learn features based on statistical structure or correlation within the input data. The learned features can be provided to a mathematical model that can map detected features to an output. The mathematical model used by the network is generally specialized for the specific task to be performed, and different models will be used to perform different tasks.

Once the neural network is structured, a learning model can be applied to the network to train the network to perform specific tasks. The learning model describes how to adjust the weights within the model to reduce the output error of the network. Backpropagation of errors is a common method used to train neural networks. An input vector is presented to the network for processing. The output of the network is compared to the desired output using a loss function and an error value is calculated for each of the neurons in the output layer. The error values are then propagated backwards until each neuron has an associated error value which roughly represents its contribution to the original output. The network can then learn from those errors using an algorithm, such as the stochastic gradient descent algorithm, to update the weights of the of the neural network.

Figure 9:
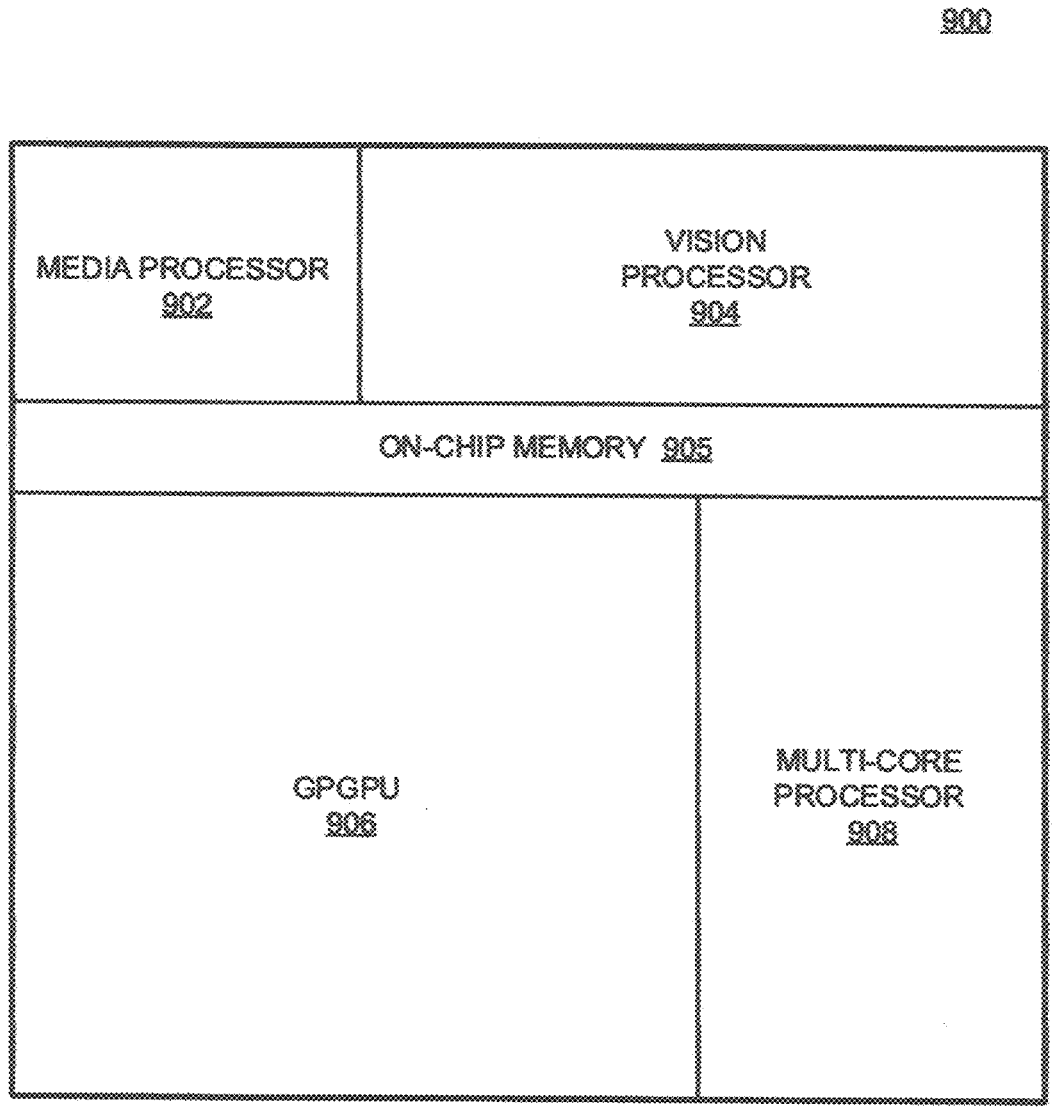
FIG. 9 illustrates an exemplary system on a chip (SOC) suitable for performing video conferencing according to some embodiments.

FIG. 9 illustrates an exemplary system on a chip (SOC) 900 suitable for performing inferencing using a trained model. One or more components of FIG. 9 may be used to implement conferencing application 110. The SOC 900 can integrate processing components including a media processor 902, a vision processor 904, a GPGPU 906 and a multi-core processor 908. The SOC 900 can additionally include on-chip memory 905 that can enable a shared on-chip data pool that is accessible by each of the processing components. The processing components can be optimized for low power operation to enable deployment to a variety of machine learning platforms, including autonomous vehicles and autonomous robots.

The multi-core processor 908 can include control logic to assist with sequencing and synchronization of data transfers and shared memory operations performed by the media processor 902 and the vision processor 904. The multi-core processor 908 can also function as an application processor to execute software applications that can make use of the inferencing compute capability of the GPGPU 906. For example, at least a portion of the action item generator logic can be implemented in software executing on the multi-core processor 908. Such software can directly issue computational workloads to the GPGPU 906 or the computational workloads can be issued to the multi-core processor 908, which can offload at least a portion of those operations to the GPGPU 906.

Flowcharts representative of example hardware logic, machine readable instructions, hardware implemented state machines, and/or any combination thereof for implementing computing device 900, for example, are shown in FIG. 6. The machine-readable instructions may be one or more executable programs or portion(s) of an executable program for execution by a computer processor such as the processor 714 shown in the example computing device 700 discussed above in connection with FIG. 7. The program may be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowcharts illustrated in FIG. 6, many other methods of implementing the example action item generator 208 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine-readable instructions described herein may be stored in one or more of a compressed format, an encrypted format, a fragmented format, a compiled format, an executable format, a packaged format, etc. Machine-readable instructions as described herein may be stored as data (e.g., portions of instructions, code, representations of code, etc.) that may be utilized to create, manufacture, and/or produce machine executable instructions. For example, the machine-readable instructions may be fragmented and stored on one or more storage devices and/or computing devices (e.g., servers). The machine-readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine-readable instructions may be stored in multiple parts, which are individually compressed, encrypted, and stored on separate computing devices, wherein the parts when decrypted, decompressed, and combined form a set of executable instructions that implement a program such as that described herein.

In another example, the machine-readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine-readable instructions may be configured (e.g., settings stored, data input, network addresses recorded, etc.) before the machine-readable instructions and/or the corresponding program(s) can be executed in whole or in part. Thus, the disclosed machine-readable instructions and/or corresponding program(s) are intended to encompass such machine-readable instructions and/or program(s) regardless of the particular format or state of the machine-readable instructions and/or program(s) when stored or otherwise at rest or in transit.

The machine-readable instructions described herein can be represented by any past, present, or future instruction language, scripting language, programming language, etc. For example, the machine-readable instructions may be represented using any of the following languages: C, C++, Java, C#, Perl, Python, JavaScript, HyperText Markup Language (HTML), Structured Query Language (SQL), Swift, etc.

As mentioned above, the example process of FIG. 6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended.

The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Descriptors "first", "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

The foregoing description and drawings are to be regarded in an illustrative rather than a restrictive sense. Persons skilled in the art will understand that various modifications and changes may be made to the embodiments described herein without departing from the broader spirit and scope of the features set forth in the appended claims.

What is claimed is:

1. A method comprising:
   receiving an action item trigger by a user of a conferencing application; and
   in response to receiving the action item trigger:

generating spoken words from audio data of a session of the conferencing application for a previous predetermined number of sentences spoken before receiving the action item trigger;

normalizing the spoken words;

generating higher level representations of the normalized spoken words;

determining semantic similarities of the higher-level representations of the normalized spoken words and higher-level representations of normalized action words of an action word list;

ranking options for top spoken words and action words based at least in part on the semantic similarities;

identifying candidates for action words and/or phrases from the top spoken words and action words; and parsing the candidates to generate one or more action items.

2. The method of claim 1, comprising normalizing action words in the action word list and generating higher-level representations of the normalized action words.

3. The method of claim 1, comprising parsing the candidates to generate one or more action items by:

dividing, by a trained neural network, candidate action phrases into words based at least in part on data from a dependency databank;

classifying the words into dependency classes according to a set of rules; and generating one or more action items based at least in part on the dependency classes.

4. The method of claim 1, wherein the action item trigger comprises an input selection in real-time by the user of a user interface of the conferencing application.

5. The method of claim 1, wherein the one or more action items comprises a task assigned to be performed by a person based on analysis of the audio data of the session of the conferencing application.

6. The method of claim 5, comprising sending an email to the person's email account notifying the person of the assigned task.

7. The method of claim 1, comprising generating spoken words from audio data of the session of the conferencing application for a previous predetermined period of time before receiving the action item trigger instead of for the previous predetermined number of sentences spoken before receiving the action trigger.

8. The method of claim 1, comprising excluding spoken words attributable to the user.

9. The method of claim 1, wherein the action word list comprises a private lexicon.

10. At least one non-transitory machine-readable storage medium comprising instructions that, when executed, cause at least one processor to:

receive an action item trigger by a user of a conferencing application; and in response to receiving the action item trigger:

generate spoken words from audio data of a session of the conferencing application for a previous predetermined number of sentences spoken before receiving the action item trigger;

normalize the spoken words;

generate higher-level representations of the normalized spoken words;

determine semantic similarities of the higher-level representations of the normalized spoken words and higher-level representations of normalized action words of an action word list;

rank options for top spoken words and action words based at least in part on the semantic similarities;

identify candidates for action words and/or phrases from the top spoken words and action words; and parse the candidates to generate one or more action items.

11. The least one non-transitory machine-readable storage medium of claim 10 comprising instructions that, when executed, cause at least one processor to normalize action words in the action word list and generate higher level representations of the normalized action words.

12. The least one non-transitory machine-readable storage medium of claim 10 comprising instructions that, when executed, cause at least one processor to parse the candidates to generate one or more action items by:

dividing, by a trained neural network, candidate action phrases into words based at least in part on data from a dependency databank;

classifying the words into dependency classes according to a set of rules; and generating one or more action items based at least in part on the dependency classes.

13. The least one non-transitory machine-readable storage medium of claim 10, wherein the action item trigger comprises an input selection in real-time by the user of a user interface of the conferencing application.

14. The least one non-transitory machine-readable storage medium of claim 10, wherein the one or more action items comprises a task assigned to be performed by a person based on analysis of the audio data of the session of the conferencing application.

15. An apparatus comprising:

a conferencing manager to receive audio data and an action item trigger; and an action item generator to receive an action item trigger by a user of a conferencing application; and in response to receiving the action item trigger, to generate spoken words from the audio data of a session of the conferencing application for a previous predetermined number of sentences spoken before receiving the action item trigger; normalize the spoken words; generate higher level representations of the normalized spoken words; determine semantic similarities of the higher level representations of the normalized spoken words and higher level representations of normalized action words of an action word list; rank options for top spoken words and action words based at least in part on the semantic similarities; identify candidates for action words and/or phrases from the top spoken words and action words; and parse the candidates to generate one or more action items.

16. The apparatus of claim 15 wherein the action item generator is to normalize action words in the action word list and generate higher level representations of the normalized action words.

17. The apparatus of claim 15 wherein the action item generator to parse the candidates to generate one or more action items by dividing, by a trained neural network, candidate action phrases into words based at least in part on data from a dependency databank; classifying the words into dependency classes according to a set of rules; and generating one or more action items based at least in part on the dependency classes.

18. The apparatus of claim 15, wherein the action item trigger comprises an input selection in real-time by the user of a user interface of the conferencing application.

19. The apparatus of claim 15, wherein the one or more action items comprises a task assigned to be performed by a person based on analysis of the audio data of the session of the conferencing application.

\* \* \* \* \*